United States Patent
Kim et al.

(10) Patent No.: US 10,300,851 B1
(45) Date of Patent: May 28, 2019

(54) METHOD FOR WARNING VEHICLE OF RISK OF LANE CHANGE AND ALARM DEVICE USING THE SAME

(71) Applicant: StradVision, Inc., Gyeongbuk (KR)

(72) Inventors: Kye-Hyeon Kim, Seoul (KR); Yongjoong Kim, Gyeongsangbuk-do (KR); Insu Kim, Gyeongsangbuk-do (KR); Hak-Kyoung Kim, Gyeongsangbuk-do (KR); Woonhyun Nam, Gyeongsangbuk-do (KR); Sukhoon Boo, Gyeonggi-do (KR); Myungchul Sung, Gyeongsangbuk-do (KR); Donghun Yeo, Gyeongsangbuk-do (KR); Wooju Ryu, Gyeongsangbuk-do (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongbuk (KR)

( * ) Notice: Subject to any disclaimer, the term of this patent is extended or adjusted under 35 U.S.C. 154(b) by 0 days.

(21) Appl. No.: 16/151,760

(22) Filed: Oct. 4, 2018

(51) Int. Cl.
| | |
|---|---|
| *B60Q 9/00* | (2006.01) |
| *G06N 3/08* | (2006.01) |
| *G06T 7/11* | (2017.01) |
| *G06T 7/70* | (2017.01) |
| *G06T 7/20* | (2017.01) |

(52) U.S. Cl.
CPC .............. *B60Q 9/008* (2013.01); *G06N 3/08* (2013.01); *G06T 7/11* (2017.01); *G06T 7/20* (2013.01); *G06T 7/70* (2017.01); *G06T 2207/20084* (2013.01); *G06T 2207/30256* (2013.01); *G06T 2207/30261* (2013.01)

(58) Field of Classification Search
USPC .................................. 382/103, 104, 155–159
See application file for complete search history.

(56) References Cited

U.S. PATENT DOCUMENTS

| | | | | |
|---|---|---|---|---|
| 7,783,403 B2* | 8/2010 | Breed | ................. | B60R 21/0134 |
| | | | | 340/435 |
| 7,859,432 B2* | 12/2010 | Kim | ...................... | B60Q 9/008 |
| | | | | 340/435 |
| 8,269,652 B2* | 9/2012 | Seder | .................... | G01S 13/723 |
| | | | | 340/435 |
| 8,665,079 B2* | 3/2014 | Pawlicki | ............... | B60W 30/18 |
| | | | | 340/435 |
| 9,139,135 B2* | 9/2015 | Assaf | ........................ | B60R 1/12 |

(Continued)

*Primary Examiner* — Ishrat I Sherali
(74) *Attorney, Agent, or Firm* — Husch Blackwell LLP

(57) ABSTRACT

A method for warning a vehicle of a risk of lane change is provided. The method includes steps of: (a) an alarm device, if at least one rear image captured by a running vehicle is acquired, segmenting the rear image by using a learned convolutional neural network (CNN) to thereby obtain a segmentation image corresponding to the rear image; (b) the alarm device checking at least one free space ratio in at least one blind spot by referring to the segmentation image, wherein the free space ratio is determined as a ratio of a road area without an object in the blind spot to a whole area of the blind spot; and (c) the alarm device, if the free space ratio is less than or equal to at least one predetermined threshold value, warning a driver of the vehicle of the risk of lane change.

24 Claims, 12 Drawing Sheets

(56) References Cited

U.S. PATENT DOCUMENTS

| | | | | |
|---|---|---|---|---|
| 9,852,635 B2* | 12/2017 | Fukuda | .................. | G08G 1/167 |
| 9,988,047 B2* | 6/2018 | Johnson | ................ | B60W 30/12 |
| 2002/0005778 A1* | 1/2002 | Breed | .................... | B60Q 9/008 |
| | | | | 340/435 |
| 2008/0291000 A1* | 11/2008 | Kim | ....................... | B60Q 9/008 |
| | | | | 340/436 |
| 2008/0304705 A1* | 12/2008 | Pomerleau | ................ | B60R 1/00 |
| | | | | 382/103 |
| 2011/0115615 A1* | 5/2011 | Luo | ........................... | B60R 1/00 |
| | | | | 340/436 |
| 2013/0135089 A1* | 5/2013 | Sejalon | ..................... | B60R 1/00 |
| | | | | 340/435 |
| 2017/0101097 A1* | 4/2017 | Buchner | ............... | B60W 30/12 |

* cited by examiner

BS  BS

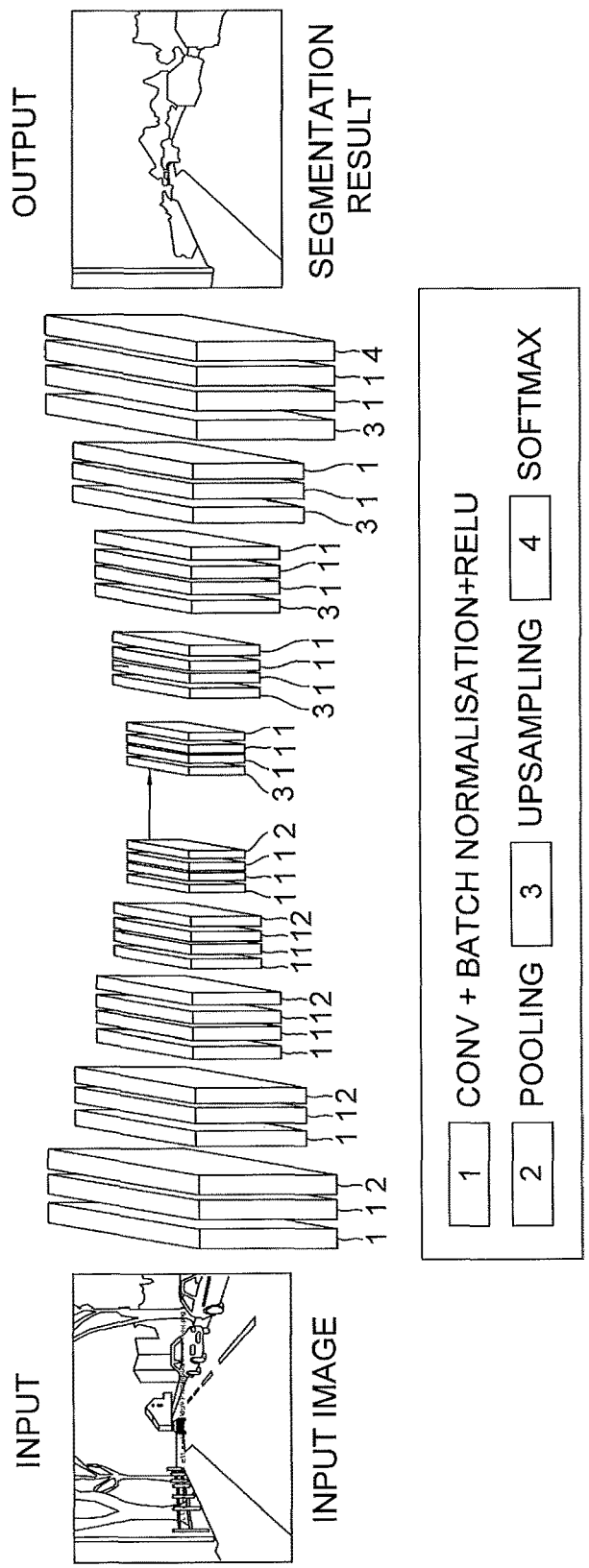

US 10,300,851 B1

METHOD FOR WARNING VEHICLE OF RISK OF LANE CHANGE AND ALARM DEVICE USING THE SAME

FIELD OF THE INVENTION

The present invention relates to a method for warning a vehicle of a risk of lane change and an alarm device using the same; and more particularly, to the method for warning the vehicle of the risk of the lane change, including steps of: (a) if at least one rear image captured by a running vehicle is acquired, segmenting the rear image by using a learned convolutional neural network (CNN) to thereby obtain a segmentation image corresponding to the rear image; (b) checking at least one free space ratio in at least one blind spot by referring to the segmentation image, wherein the free space ratio is determined as a ratio of a road area without an object in the blind spot to a whole area of the blind spot; and (c) if the free space ratio is less than or equal to at least one predetermined threshold value, warning a driver of the vehicle of the risk of lane change, and the alarm device using the same.

BACKGROUND OF THE INVENTION

A monitoring vehicle has a side view mirror for each side thereof and a rear-view mirror at the front center of its cabin for a good field of view of the side and the rear needed for a change of lanes by a driver.

Although the side view mirror is used for seeing each side and the rear thereof, it has a blind spot (BS) where the driver cannot see a monitored vehicle or any other objects that are very close thereto.

This has been a problem because there can be an accident with the monitored vehicle in the blind spot if the driver changes lanes without seeing the monitored vehicle.

To prevent such a problem, the driver sometimes put a convex mirror onto a corner of the side view mirror, which enables the driver to see the blind spot.

However, even when the convex mirror is added onto the side view mirror, the driver must see the blind spot with his/her own eyes to change lanes which puts further strain to the driver, and there may exist the blind spot that still cannot be seen through the convex mirror even if the driver alters his/her head position.

To prevent this, a blind spot monitoring system is suggested recently that aims to prevent accidents from happening when the driver changes lanes without noticing the monitored vehicle in the blind spot, by providing the driver with information on a detection of the monitored vehicle located in the blind spot or approaching the blind spot, through a sensor placed at the rear of the monitoring vehicle.

Especially, blind spot monitoring systems using a vision sensor generally adopt algorithms capable of detecting several characteristics based on visual information.

However, those algorithms may show limited detection rates constrained by external environment, shape of the objects, and a configuration of a system. Because an accurate detection requires a number of visual processing, a computational load is very heavy. Therefore, real-time detection may be difficult in an embedded system due to limited processing resources.

One of the major issues in a convolutional neural network (CNN) that causes a slow speed is a region proposal network (RPN). To extract one or more candidates from a feature map, the RPN determines whether a sliding window includes at least one of the candidates in each and every location. A fully connected (FC) determines whether at least one of the candidates is a vehicle, however, many of the candidates overlap each other and the RPN consumes much time for performing computation on these redundant candidates which hardly help improve a detection rate.

As another example of detecting the monitored vehicle using a vision sensor, there is an optical flow method which expresses movement of visual pixels by motion vectors. However, an algorithm for recognition of the monitored vehicle using the optical flow method has much dependence on a change in a background and a visual noise, and requires an enormous computational load, therefore, real-time detection of the monitored vehicle is not easy.

SUMMARY OF THE INVENTION

It is an object of the present invention to solve all the aforementioned problems.

It is another object of the present invention to easily detect a vehicle located in a blind spot.

It is still another object of the present invention to detect the vehicle located in the blind spot regardless of a driving environment of the vehicle.

It is still yet another object of the present invention to provide an algorithm with a small amount of data to be calculated for detecting the vehicle located in the blind spot.

It is still yet another object of the present invention to accurately detect the vehicle located in the blind spot by using a segmentation image acquired through a convolutional neural network (CNN).

It is still yet another object of the present invention is to accurately detect the vehicle in the blind spot by a simple method of detecting a vehicle-free road area in the blind spot by using the segmentation image acquired through the CNN.

In accordance with one aspect of the present invention, there is provided a method for warning a vehicle of a risk of lane change, including steps of: (a) an alarm device, if at least one rear image captured by a running vehicle is acquired, segmenting the rear image by using a learned convolutional neural network (CNN) to thereby obtain a segmentation image corresponding to the rear image; (b) the alarm device checking at least one free space ratio in at least one blind spot by referring to the segmentation image, wherein the free space ratio is determined as a ratio of a road area without an object in the blind spot to a whole area of the blind spot; and (c) the alarm device, if the free space ratio is less than or equal to at least one predetermined threshold value, warning a driver of the vehicle of the risk of lane change.

As one example, the blind spot includes a first sub-blind spot to an n-th sub-blind spot which are set by distances in a direction away from a rear of the vehicle, each of a first threshold value to an n-th threshold value, as each threshold value for the free space ratio, is set for each of the first sub-blind spot to the n-th sub-blind spot, and, at the step of (c), the alarm device warns the driver differently according to a distance between the vehicle and a k-th sub-blind spot having the free space ratio less than or equal to a k-th threshold value.

As one example, on condition that (i) a case that the free space ratio of the k-th sub-blind spot is less than or equal to the k-th threshold value, and the free space ratio of (k−1)-th sub-blind spot is 100% is referred to as a first case, (ii) a case that the free space ratio of the k-th sub-blind spot is less than or equal to the k-th threshold value, and the free space ratio of (k−1)-th sub-blind spot is less than or equal to the (k−1)-th threshold value is referred to as a second case, and (iii) a case that the free space ratio of the k-th sub-blind spot is 100%, and the free space ratio of (k−1)-th sub-blind spot is less than or equal to the (k−1)-th threshold value is referred to as a third case, the alarm device informs the driver that an object is closer to the vehicle in the second case and the third case as compared to the vehicle in the first case.

As one example, on condition that the free space ratio of the k-th sub-blind spot exceeds the k-th threshold value and is less than or equal to a k'-th threshold value which is set to be a value greater than the k-th threshold value, if the free space ratio of a (k+1)-th sub-blind spot is less than or equal to a (k+1)-th threshold value, the alarm device warns the driver differently according to the distance between the vehicle and the k-th sub-blind spot.

As one example, the alarm device obtains movement information of the object within the first sub-blind spot to the n-th sub-blind spot by referring to each rate of change in the free space ratio of each of the first sub-blind spot to the n-th sub-blind spot, and the alarm device warns the driver according to a distance between the k-th sub-blind spot and the vehicle by referring to the obtained movement information of the object.

As one example, if the free space ratio in the (k+1)-th sub-blind spot increases from a state in which the free space ratio is less than or equal to a (k+1)-th threshold value and if the free space ratio in the k-th sub-blind spot decreases, the alarm device determines that the object is moving from the (k+1)-th sub-blind spot to the k-th sub-blind spot, if the free space ratio in the (k−1)-th sub-blind spot increases from a state in which the free space ratio is less than or equal to a (k−1)-th threshold value and if the free space ratio in the k-th sub-blind spot decreases, the alarm device determines that the object is moving from the (k−1)-th sub-blind spot to the k-th sub-blind spot, and the alarm device warns the driver according to the distance between the k-th sub-blind spot and the vehicle by further referring to the movement direction of the object in the k-th sub-blind spot.

As one example, the alarm device refers to a rate of change in the free space ratio in the k-th sub-blind spot to thereby check a velocity or an acceleration of the object, and refers to the velocity or the acceleration of the object to thereby warn the driver according to the distance between the k-th sub-blind spot and the vehicle.

As one example, on condition that it is determined that the object is approaching the vehicle as a result of checking the velocity or the acceleration of the object, if the free space ratio of the k-th sub-blind spot is less than or equal to a k''-th threshold value which is set to be a value greater than the k-th threshold value, the alarm device warns the driver according to the distance between the k-th sub-blind spot and the vehicle.

As one example, if the rear image represents a rear image obtained from a t-th frame, at the step of (c), the alarm device checks a relative movement direction of the object corresponding to a running direction of the vehicle by using (i) a t-th ratio which represents the free space ratio in the blind spot obtained from the rear image in the t-th frame and (ii) each of a (t−1)-th ratio to a (t−i)-th ratio which represents the free space ratio in the blind spot obtained from the rear image in a (t−1)-th frame to the rear image in a (t−i)-th frame, and warns the driver of the risk of the lane change by referring to the relative movement direction of the object.

As one example, the alarm device analyzes an increase rate of from the (t−i)-th rate to the t-th rate, and, if the increase rate is a negative value, determines that the object has moved from an external side of the blind spot to an inner side of the blind spot, and, if the increase rate is a positive value, determines that the object has moved from the inner side of the blind spot to the external side of the blind spot, and the alarm device warns the driver of the risk of the lane change by further referring to the determined movement direction of the object.

As one example, the alarm device analyzes the segmentation image at a specific frame which is selected among the (t−i)-th frame to the t-th frame by referring to information on which of the (t−i)-th rate to the t-th rate changes from a rate of 100% to a rate of less than 100%, the alarm device determines whether an area where the object is located in the blind spot is an area adjacent to the vehicle or an area away from the vehicle to thereby check a location of entrance of the object into the blind spot, then checks a movement direction of the object relative to that of the vehicle by referring to the location of the entrance of the object into the blind spot and the movement direction of the object, and the alarm device warns the driver of the risk of the lane change by further referring to the movement direction of the object relative to that of the vehicle.

As one example, at the step of (a), the warning device applies at least one convolutional operation to the rear image to thereby generate at least one feature map as a downsampled feature map and then applies at least one deconvolutional operation to the downsampled feature map to thereby segment the road area and the object in the rear image.

In accordance with another aspect of the present invention, there is provided an alarm device for warning a vehicle of a risk of lane change, including: a communication part for acquiring at least one rear image captured by a running vehicle; and a processor for performing processes of (I) segmenting the rear image by using a learned convolutional neural network (CNN) to thereby obtain a segmentation image corresponding to the rear image, (II) checking at least one free space ratio in at least one blind spot by referring to the segmentation image, wherein the free space ratio is determined as a ratio of a road area without an object in the blind spot to a whole area of the blind spot, and (III) if the free space ratio is less than or equal to at least one predetermined threshold value, warning a driver of the vehicle of the risk of lane change.

As one example, the blind spot includes a first sub-blind spot to an n-th sub-blind spot which are set by distances in a direction away from a rear of the vehicle, wherein each of a first threshold value to an n-th threshold value, as each threshold value for the free space ratio, is set for each of the first sub-blind spot to the n-th sub-blind spot, and wherein, at the process of (III), the processor warns the driver differently according to a distance between the vehicle and a k-th sub-blind spot having the free space ratio less than or equal to a k-th threshold value.

As one example, on condition that (i) a case that the free space ratio of the k-th sub-blind spot is less than or equal to the k-th threshold value, and the free space ratio of (k−1)-th sub-blind spot is 100% is referred to as a first case, (ii) a case that the free space ratio of the k-th sub-blind spot is less than or equal to the k-th threshold value, and the free space ratio of (k−1)-th sub-blind spot is less than or equal to the (k−1)-th threshold value is referred to as a second case, and (iii) a case that the free space ratio of the k-th sub-blind spot is 100%, and the free space ratio of (k−1)-th sub-blind spot is less than or equal to the (k−1)-th threshold value is referred to as a third case, the processor informs the driver that an object is closer to the vehicle in the second case and the third case as compared to the vehicle in the first case.

As one example, on condition that the free space ratio of the k-th sub-blind spot exceeds the k-th threshold value and is less than or equal to a k'-th threshold value which is set to be a value greater than the k-th threshold value, if the free space ratio of a (k+1)-th sub-blind spot is less than or equal to a (k+1)-th threshold value, the processor warns the driver differently according to the distance between the vehicle and the k-th sub-blind spot.

As one example, the processor obtains movement information of the object within the first sub-blind spot to the n-th sub-blind spot by referring to each rate of change in the free space ratio of each of the first sub-blind spot to the n-th sub-blind spot, and the processor warns the driver according to a distance between the k-th sub-blind spot and the vehicle by referring to the obtained movement information of the object.

As one example, if the free space ratio in the (k+1)-th sub-blind spot increases from a state in which the free space ratio is less than or equal to a (k+1)-th threshold value and if the free space ratio in the k-th sub-blind spot decreases, the processor determines that the object is moving from the (k+1)-th sub-blind spot to the k-th sub-blind spot, if the free space ratio in the (k−1)-th sub-blind spot increases from a state in which the free space ratio is less than or equal to a (k−1)-th threshold value and if the free space ratio in the k-th sub-blind spot decreases, the processor determines that the object is moving from the (k−1)-th sub-blind spot to the k-th sub-blind spot, and the processor warns the driver according to the distance between the k-th sub-blind spot and the vehicle by further referring to the movement direction of the object in the k-th sub-blind spot.

As one example, the processor refers to a rate of change in the free space ratio in the k-th sub-blind spot to thereby check a velocity or an acceleration of the object, and refers to the velocity or the acceleration of the object to thereby warn the driver according to the distance between the k-th sub-blind spot and the vehicle.

As one example, on condition that it is determined that the object is approaching the vehicle as a result of checking the velocity or the acceleration of the object, if the free space ratio of the k-th sub-blind spot is less than or equal to a k"-th threshold value which is set to be a value greater than the k-th threshold value, the processor warns the driver according to the distance between the k-th sub-blind spot and the vehicle.

As one example, if the rear image represents a rear image obtained from a t-th frame, at the process of (III), the processor checks a relative movement direction of the object corresponding to a running direction of the vehicle by using (i) a t-th ratio which represents the free space ratio in the blind spot obtained from the rear image in the t-th frame and (ii) each of a (t−1)-th ratio to a (t−i)-th ratio which represents the free space ratio in the blind spot obtained from the rear image in a (t−1)-th frame to the rear image in a (t−i)-th frame, and warns the driver of the risk of the lane change by referring to the relative movement direction of the object.

As one example, the processor analyzes an increase rate of from the (t−i)-th rate to the t-th rate, and, if the increase rate is a negative value, determines that the object has moved from an external side of the blind spot to an inner side of the blind spot, and, if the increase rate is a positive value, determines that the object has moved from the inner side of the blind spot to the external side of the blind spot, and the processor warns the driver of the risk of the lane change by further referring to the determined movement direction of the object.

As one example, the processor analyzes the segmentation image at a specific frame which is selected among the (t−i)-th frame to the t-th frame by referring to information on which of the (t−i)-th rate to the t-th rate changes from a rate of 100% to a rate of less than 100%, wherein the processor determines whether an area where the object is located in the blind spot is an area adjacent to the vehicle or an area away from the vehicle to thereby check a location of entrance of the object into the blind spot, then checks a movement direction of the object relative to that of the vehicle by referring to the location of the entrance of the object into the blind spot and the movement direction of the object, and wherein the processor warns the driver of the risk of the lane change by further referring to the movement direction of the object relative to that of the vehicle.

As one example, at the process of (I), the processor applies at least one convolutional operation to the rear image to thereby generate at least one feature map as a downsampled feature map and then applies at least one deconvolutional operation to the downsampled feature map to thereby segment the road area and the object in the rear image.

BRIEF DESCRIPTION OF THE DRAWINGS

The following drawings to be used to explain example embodiments of the present invention are only part of example embodiments of the present invention and other drawings can be obtained based on the drawings by those skilled in the art of the present invention without inventive work.

FIG. 6 is a diagram schematically illustrating a CNN which segments the rear image in accordance with one example embodiment of the present invention.

DETAILED DESCRIPTION OF THE PREFERRED EMBODIMENTS

Figure 1:
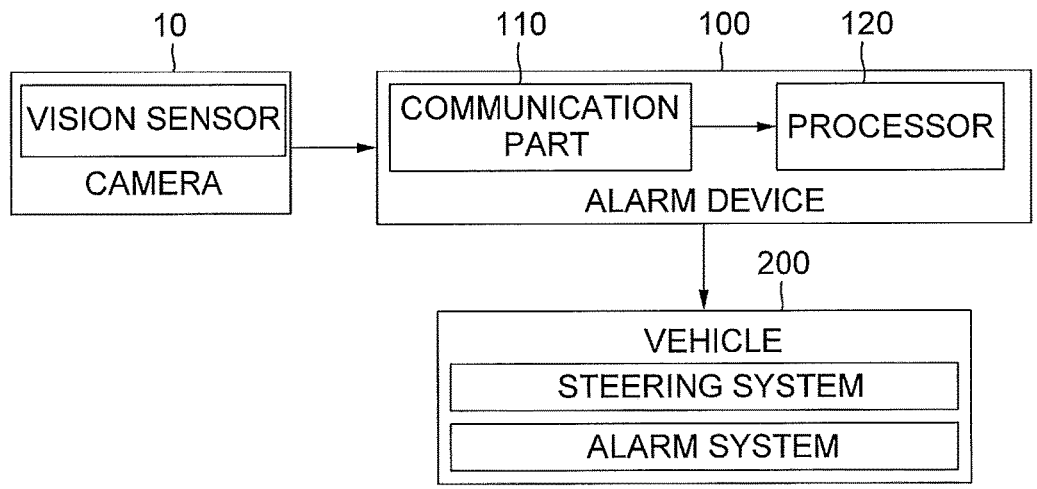
FIG. 1 is a diagram schematically illustrating an alarm system of lane change in accordance with one example embodiment of the present invention.
Figure 2:
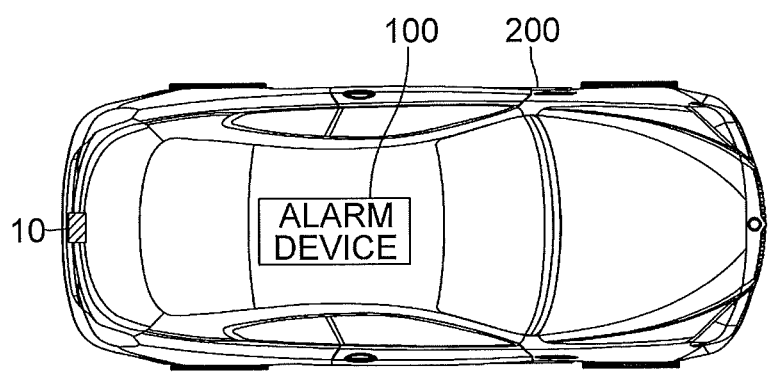
FIG. 2 is a diagram schematically illustrating a vehicle in which the alarm system of lane change is prepared in accordance with one example embodiment of the present invention.

Detailed explanation on the present invention to be made below refer to attached drawings and diagrams illustrated as specific embodiment examples under which the present invention may be implemented to make clear of purposes, technical solutions, and advantages of the present invention. These embodiments are described in sufficient detail to enable those skilled in the art to practice the invention.

Besides, in the detailed description and claims of the present invention, a term "include" and its variations are not intended to exclude other technical features, additions, components or steps. Other objects, benefits and features of the present invention will be revealed to one skilled in the art, partially from the specification and partially from the implementation of the present invention. The following examples and drawings will be provided as examples but they are not intended to limit the present invention.

Moreover, the present invention covers all possible combinations of example embodiments indicated in this specification. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as shown below.

First of all, FIG. 1 is a diagram schematically illustrating an alarm system for a lane change in accordance with one example embodiment of the present invention. By referring to FIG. 1, the alarm system for the lane change may include an alarm device 100 and a vehicle 200.

The alarm device 100 detects an object, e.g., another vehicle, which is located in the blind spot of the vehicle 200 or is approaching the blind spot, and can analyze a rear image captured by a vision sensor 10, e.g., a camera, of the vehicle 200 to thereby determine whether the object is located in the blind spot of the vehicle 200.

Herein, the vehicle 200 may be prevented from changing the lane towards the blind spot by referring to information transmitted from the alarm device 100 and information of a steering system or the alarm device 100 may inform the driver of the vehicle 200 of a fact that the object is located in the blind spot. In particular, if the vehicle is an autonomous vehicle, the vehicle 200 can determine whether it is safe to change the lane by referring to information on the object in the blind spot and the driving environment.

In addition, the alarm device 100 may include (i) a communication unit 100 for acquiring the rear image viewed from the vehicle, which is captured by the vision sensor 10 such as a camera while driving, and (ii) a processor 120 for analyzing the acquired rear image to thereby determine whether the object is located in the blind spot of the vehicle 200 and warn the driver as the case may be. Herein, the vision sensor 10 is installed at an arbitrary position of the vehicle and captures at least one rear image of the vehicle 200 and may include a charge coupled device (CCD), a complementary metal oxide semiconductor (CMOS), and an optical sensor such as an image capturing device.

Further, the processor 120 (i) segments the rear image by using the learned CNN to thereby obtain a segmentation image corresponding to the rear image, (ii) checks at least one free space ratio in a predetermined blind spot by referring to the segmentation image, in which the free space ratio is determined as a ratio of a road area without an object in the blind spot to a whole area of the blind spot, and (iii) if the free space ratio is less than or equal to at least one predetermined threshold value, warns the driver of the vehicle of the risk level of lane change.

Figure 3:
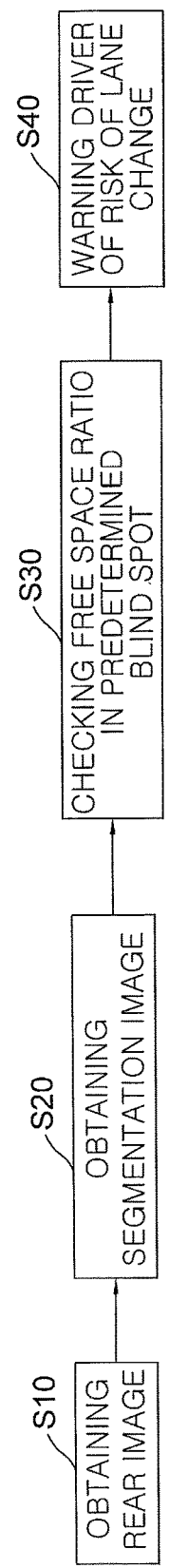
FIG. 3 is a diagram illustrating a method for warning a lane change in accordance with one example embodiment of the present invention.

The method for warning the driver of lane change when the driver tries to change the lane toward the blind spot even if there is any object in the blind spot in accordance with one example embodiment of the present invention will be described in detail by referring to FIG. 3.

Figure 4:
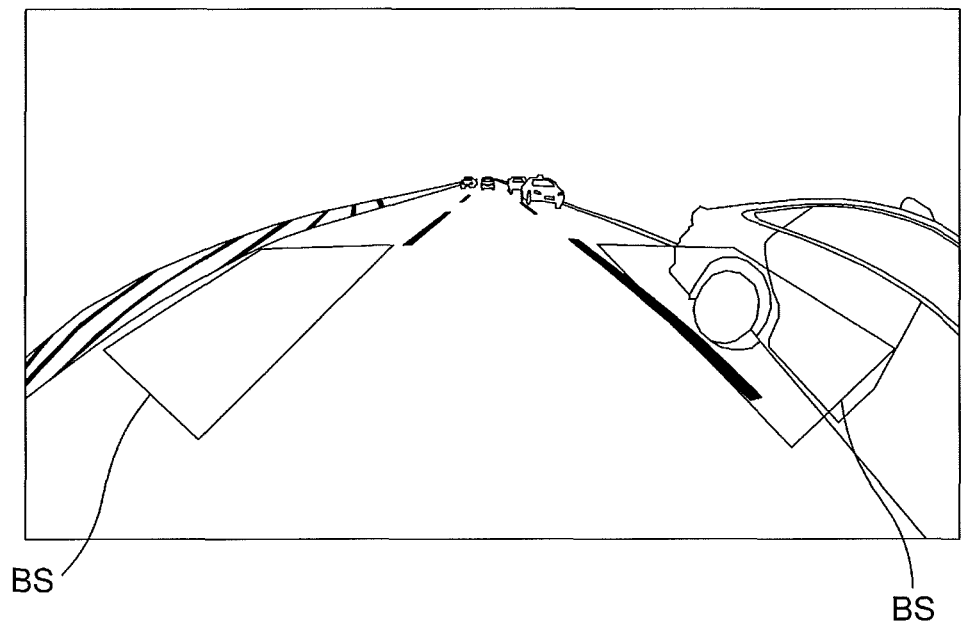
FIG. 4 is a diagram schematically illustrating a rear image obtained from the vehicle in accordance with one example embodiment of the present invention.
Figure 5:
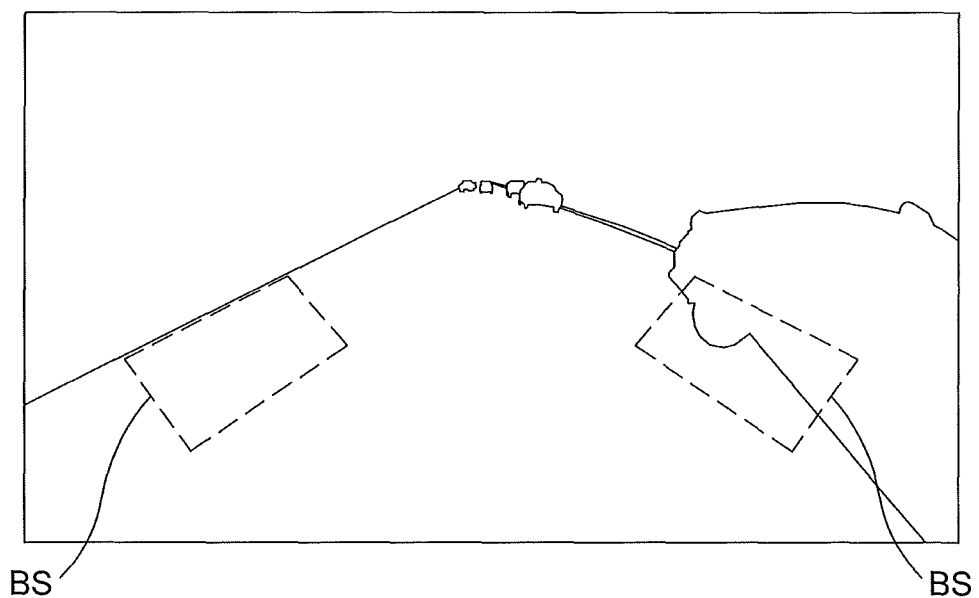
FIG. 5 is a diagram schematically illustrating a segmentation image generated by segmenting the rear image of the vehicle in accordance with one example embodiment of the present invention.

First of all, if at least one rear image captured by, e.g., a vision sensor installed in the vehicle, as in FIG. 4, is obtained through the communication unit at the step of S10, the processor of the alarm device obtains the segmentation image, as in FIG. 5, in which a road area is separated from an object area in the rear image at the step of S20.

Herein, the alarm device can obtain the segmentation image corresponding to the rear image by using a CNN-based segmentation method.

In addition, a fully convolutional network (FCN), a deconvolutional network, a dilated convolution, etc. may be used as the CNN-based segmentation method, but the present invention is not limited to these examples and may use a method or a logic capable of performing semantic segmentation from the image.

For example, as illustrated in FIG. 6, an encoder-decoder configuration including the convolutional network and the deconvolutional network may be adopted. In detail, the alarm device can downsample the rear image through a plurality of convolution layers included in the encoder and then upsample the downsampled rear image through a plurality of deconvolution layers included in the decoder, to thereby generate the segmentation image corresponding to the rear image.

In addition, in order to distinguish the road area from the object, e.g., a specific vehicle to be monitored, other objects other than the road and the specific vehicle may be set as the background.

Thereafter, the alarm device can check the free space ratio in the predetermined blind spot by referring to the segmentation image at the step of S30. Herein, by referring to FIG. 5, the free space ratio may be determined as a ratio of the road area without the object in the blind spot to the whole area of the blind spot.

Thereafter, if the free space ratio is less than or equal to the predetermined threshold value, the alarm device determines that an object is located in the blind spot to thereby warn the driver of the risk of lane change at the step of S40.

For example, if it is determined that the object is located in the blind spot of the vehicle, the alarm device can transmit information on the location of the object to the control unit of the vehicle to thereby prevent the vehicle from changing the lane towards the blind spot where the object is located. Herein, when the driver tries to change the lane by referring to the information of the steering system, if the object is located in the blind spot of the lane, the control unit of the vehicle can inform the driver of the fact that there is the object in the blind spot through the alarm system to thereby prevent a danger due to the lane change. In addition, on condition that the vehicle is an autonomous vehicle, the vehicle may be set to safely change lane by referring to information on whether an object is located in the blind spot and the driving environment. In addition, since the blind spot can be formed at both sides of the vehicle, respectively, the alarm device can check the free space ratio for each of blind spots at both sides to thereby determine whether any object is located in each of the blind spots.

Meanwhile, the above-described method for determining whether the object is located in the blind spot by referring to the free space ratio in the blind spot will be described in more detail as follows.

First of all, if the rear image represents a rear image obtained from a t-th frame, the alarm device can check a relative movement direction of an object corresponding to a running direction of the vehicle by using (i) a t-th ratio which represents the free space ratio in the blind spot obtained from the rear image in the t-th frame and (ii) each of a (t−1)-th ratio to a (t−i)-th ratio which represents the free space ratio in the blind spot obtained from the rear image in a (t−1)-th frame to the rear image in a (t−i)-th frame, and warn the driver of the risk of the lane change by referring to the relative movement direction of the object.

Figure 7A:
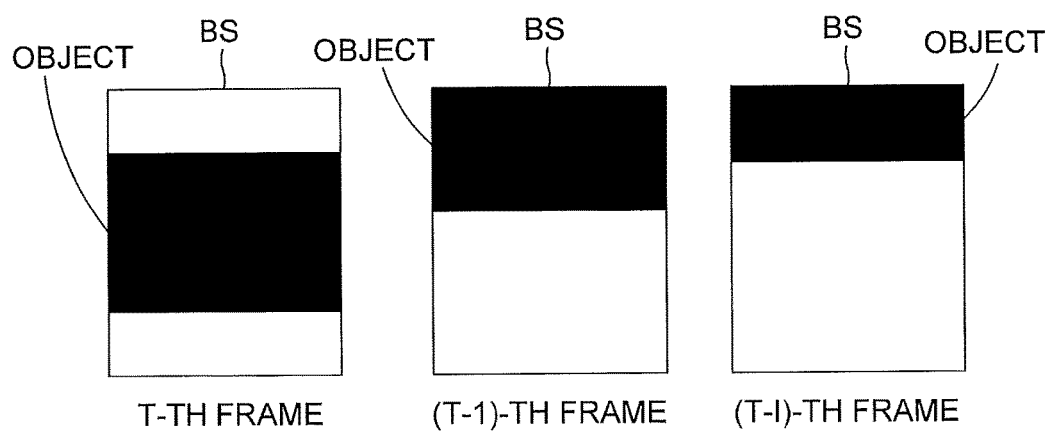
FIGS. 7A and 7B are diagrams schematically illustrating a moving state of an object in the blind spot according to a time change in accordance with one example embodiment of the present invention.
Figure 7B:
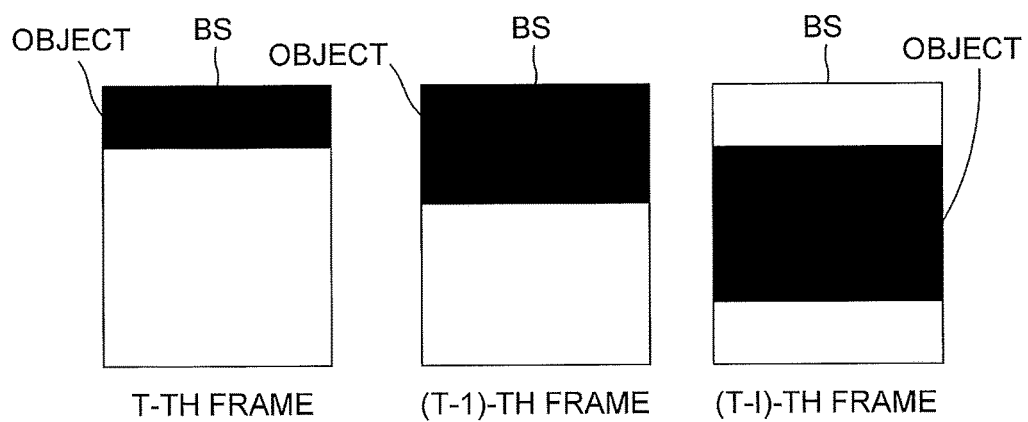

For example, by referring to FIGS. 7A and 7B, the alarm device can analyze an increase rate of from the (t−i)-th rate to the t-th rate, and, if the increase rate is a negative value, determine that the object has moved from an external side of the blind spot to an inner side of the blind spot as shown in FIG. 7A, and, if the increase rate is a positive value, determine that the object has moved from the inner side of the blind spot to the external side of the blind spot as shown in FIG. 7B, and the alarm device warns the driver of the risk of the lane change by further referring to the determined movement direction of the object.

Namely, by referring to the movement direction of the object, the alarm device warns the driver when the object is moving in a direction that becomes closer to the vehicle, and does not warn the driver when the vehicle is moving in a direction that becomes farther away from the vehicle even if there is the object in the blind spot. For example, if another vehicle moving in a direction opposite to the running direction of the vehicle is located in the blind spot, the risk due to the lane change is low, and thus the alarm device may not warn the driver.

Herein, the alarm device can analyze the segmentation image at a specific frame which is selected among the (t−i)-th frame to the t-th frame by referring to information on which of the (t−i)-th rate to the t-th rate changes from a rate of 100% to a rate of less than 100% and determine whether an area where the object is located in the blind spot is an area adjacent to the vehicle or an area away from the vehicle to thereby check a location of entrance of the object into the blind spot, then check a movement direction of the object relative to that of the vehicle by referring to the location of the entrance of the object into the blind spot and the movement direction of the object, and warn the driver of the risk of the lane change by further referring to the movement direction of the object relative to that of the vehicle.

For example, as shown in FIG. 7A, if the free space ratio gradually decreases by the entrance of the object into the blind spot area in a downward direction from the (t−i)-th frame to the t-th frame and if the free space ratio becomes less than or equal to a predetermined threshold value at the t-th frame, the alarm device can determine that the object is moving in a direction that gets closer to the vehicle to thereby warn the driver. On the other hand, as shown in FIG. 7B, if the free space ratio gradually increases by the exit of the object from the blind spot area in an upward direction from the (t−i)-th frame to the t-th frame and if the free space ratio exceeds a predetermined threshold value at the t-th frame, the alarm device can determine that the object is moving in a direction that gets farther away from the vehicle to thereby give the driver no warning.

In the above, only a few cases related to the methods of determining the relative movement direction of the object were described, but the present invention is not limited to these examples, and it is possible to set criteria for the relative movement direction of the object for each of the cases.

Figure 8:
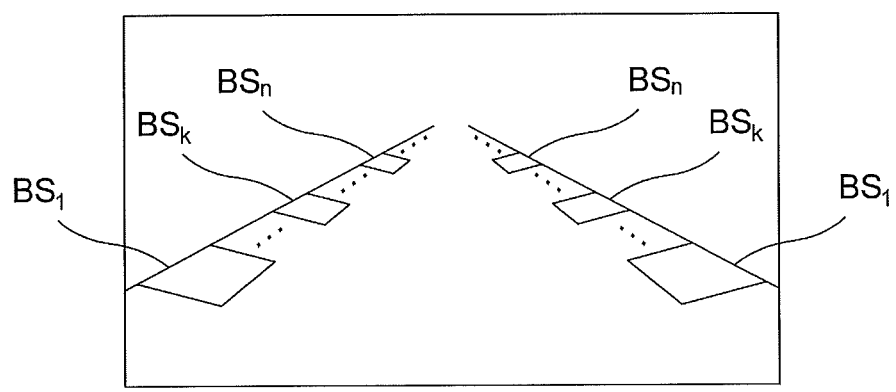
FIG. 8 is a diagram schematically illustrating a state in which a plurality of sub-blind spots are provided for each of blind spots in accordance with one example embodiment of the present invention.

Next, by referring to FIG. 8, the blind spot may include a first sub-blind spot $BS_1$ to an n-th sub-blind spot $BS_n$, which are set by distances in a direction away from the rear of the vehicle, and each of a first threshold value to an n-th threshold value, as each threshold value for the free space ratio, may be set for each of the first sub-blind spot $BS_1$ to the nth blind spot $BS_n$. Herein, the alarm device may warn the driver differently according to a distance between the vehicle and a k-th sub-blind spot $BS_k$ having a free space ratio less than or equal to a k-th threshold value.

Namely, if one of the sub-blind spots, where the free space ratio becomes less than or equal to the predetermined threshold value, is located close to the vehicle, the alarm device can inform the driver that another vehicle is located in the blind spot and is approaching the driver's vehicle.

Figure 9A:
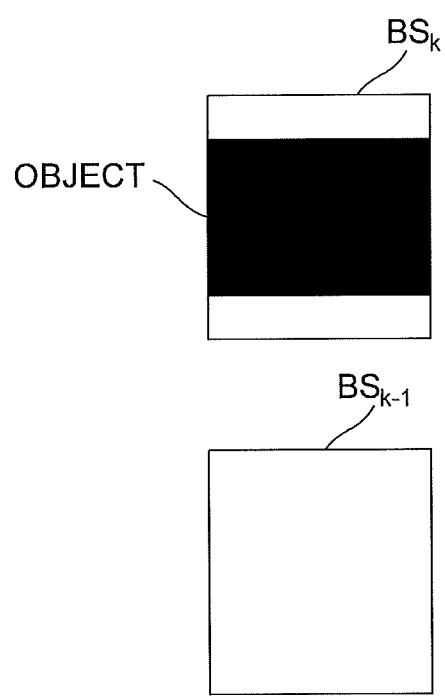
FIGS. 9A, 9B and 9C are diagrams schematically illustrating the moving state of the object in the blind spots of FIG. 8.
Figure 9B:
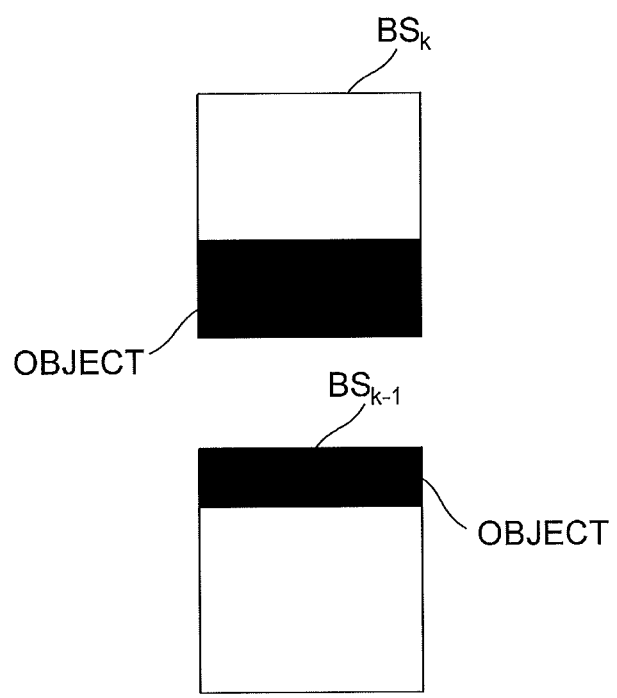
Figure 9C:
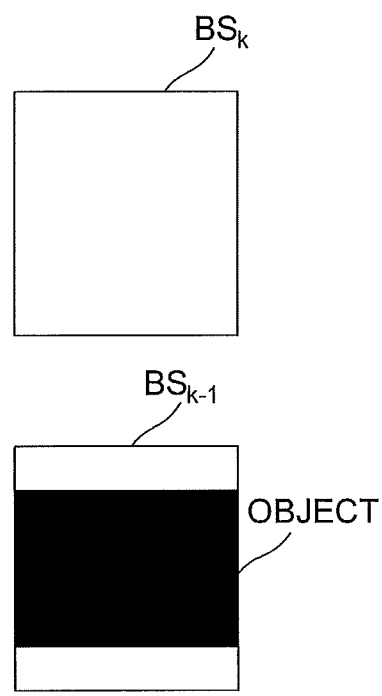

For example, on condition that (i) a case that the free space ratio of the k-th sub-blind spot $BS_k$ is less than or equal to the k-th threshold value, and the free space ratio of (k−1)-th sub-blind spot $BS_{k-1}$ is 100% is referred to as a first case as shown in FIG. 9A, (ii) a case that the free space ratio of the k-th sub-blind spot $BS_k$ is less than or equal to the k-th threshold value, and the free space ratio of (k−1)-th sub-blind spot $BS_{k-i}$ is less than or equal to the (k−1)-th threshold value is referred to as a second case as shown in FIG. 9B, and (iii) a case that the free space ratio of the k-th sub-blind spot $BS_k$ is 100%, and the free space ratio of (k−1)-th sub-blind spot $BS_{k-1}$ is less than or equal to the (k−1)-th threshold value is referred to as a third case as shown in FIG. 9C, the alarm device informs the driver that an object is closer to the vehicle in the second case and the third case as compared to the vehicle in the first case.

In addition, on condition that the free space ratio of the k-th sub-blind spot $BS_k$ exceeds the k-th threshold value and is less than or equal to a k'-th threshold value which is set to be a value greater than the k-th threshold value, if the free space ratio of a (k+1)-th sub-blind spot $BS_{k+1}$ is less than or equal to a (k+1)-th threshold value, the alarm device warns the driver differently according to the distance between the k-th sub-blind spot $BS_k$ and the vehicle.

Namely, as shown in FIG. 9B, even when the free space ratio of the k-th sub-blind spot BSk is greater than the (k−1)-th threshold value as a criterion for the alarm, if the object is moving from the k-th sub-blind spot $BS_k$ to the (k−1)-th sub-blind spot $BS_{k-1}$, i.e., if the object is approaching the vehicle, the alarm device can determine that the object is located in the (k−1)-th sub-blind spot $BS_{k-1}$ by using the k'-th threshold value which is set to be a value greater than the k-th threshold value and then warn the driver.

Furthermore, the alarm device can obtain movement information of the object within the first sub-blind spot to the n-th sub-blind spot by referring to each rate of change in the free space ratio of each of the first sub-blind spot to the n-th sub-blind spot, and warn the driver according to the distance between the k-th sub-blind spot and the vehicle by referring to the obtained movement information of the object.

For example, if the free space ratio in the (k+1)-th sub-blind spot increases from a state in which the free space ratio is less than or equal to a (k+1)-th threshold value, and the free space ratio in the k-th sub-blind spot decreases, the alarm device can determine that the object is moving from the (k+1)-th sub-blind spot to the k-th sub-blind spot. In addition, if the free space ratio in the (k−1)-th sub-blind spot increases from a state in which the free space ratio is less than or equal to a (k−1)-th threshold value, and the free space ratio in the k-th sub-blind spot decreases, the alarm device can determine that the object is moving from the (k−1)-th sub-blind spot to the k-th sub-blind spot. Furthermore, the alarm device can warn the driver according to the distance between the k-th sub-blind spot and the vehicle by further referring to the movement direction of the object in the k-th sub-blind spot. Namely, the alarm device can check the movement direction of the object by comparing the direction of change in the free space ratios in the blind spots with the running direction of the vehicle, and if the movement direction of the object is opposite to that of the running direction of the vehicle, the alarm device may not warn the driver even if the object is located in the blind spot.

In addition, the alarm device can refer to a rate of change in the free space ratio in the k-th sub-blind spot to thereby check a velocity or an acceleration of the object, and can refer to the velocity or the acceleration of the object to thereby warn the driver according to the distance between the k-th sub-blind spot and the vehicle.

For example, on condition that it is determined that the object is quickly approaching the vehicle as a result of checking the velocity or the acceleration of the object, if the free space ratio of the k-th sub-blind spot is less than or equal to a k"-th threshold value which is set to be a value greater than the k-th threshold value, the alarm device can warn the driver according to the distance between the k-th sub-blind spot and the vehicle. Namely, even when the free space ratio of the k-th sub-blind spot is greater than the k-th threshold value, if it is determined that the object located in the k-th sub-blind spot is quickly approaching the vehicle, the alarm device can inform the driver that the object in the k-th sub-blind spot is quickly approaching the driver's vehicle.

The present invention has an effect of accurately detecting the monitored vehicle in the blind spot by using the neural network algorithm.

The present invention has another effect of accurately detecting the vehicle located in the blind spot regardless of the driving environment of the vehicle.

The present invention has still another effect of detecting the vehicle in the blind spot with a small amount of computation by using the segmentation image acquired through the CNN.

The present invention has still yet another effect of detecting the vehicle in the blind spot in real time by a small amount of computation without being influenced by background motion and image noise.

The present invention has still yet another effect of accurately detecting the vehicle located in the blind spot by a simple method of detecting a vehicle-free road area in the blind spot.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a compiler but also a high level language code that can be executed by a computer using an interpreter, etc. The hardware device can work as more than a software module to perform the process in accordance with the present invention and they can do the same in the opposite case.

As seen above, the present invention has been explained by specific matters such as detailed components, limited embodiments, and drawings. They have been provided only to help more general understanding of the present invention. It, however, will be understood by those skilled in the art that various changes and modification may be made from the description without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for warning a vehicle of a risk of lane change, comprising steps of:
   (a) an alarm device, if at least one rear image captured by a running vehicle is acquired, segmenting the rear image by using a learned convolutional neural network (CNN) to thereby obtain a segmentation image corresponding to the rear image;
   (b) the alarm device checking at least one free space ratio in at least one blind spot by referring to the segmentation image, wherein the free space ratio is determined as a ratio of a road area without an object in the blind spot to a whole area of the blind spot; and
   (c) the alarm device, if the free space ratio is less than or equal to at least one predetermined threshold value, warning a driver of the vehicle of the risk of lane change.

2. The method of claim 1, wherein the blind spot includes a first sub-blind spot to an n-th sub-blind spot which are set by distances in a direction away from a rear of the vehicle,
   wherein each of a first threshold value to an n-th threshold value, as each threshold value for the free space ratio, is set for each of the first sub-blind spot to the n-th sub-blind spot, and
   wherein, at the step of (c), the alarm device warns the driver differently according to a distance between the vehicle and a k-th sub-blind spot having the free space ratio less than or equal to a k-th threshold value.

3. The method of claim 2, wherein, on condition that (i) a case that the free space ratio of the k-th sub-blind spot is less than or equal to the k-th threshold value, and the free space ratio of (k−1)-th sub-blind spot is 100% is referred to as a first case, (ii) a case that the free space ratio of the k-th sub-blind spot is less than or equal to the k-th threshold value, and the free space ratio of (k−1)-th sub-blind spot is less than or equal to the (k−1)-th threshold value is referred to as a second case, and (iii) a case that the free space ratio of the k-th sub-blind spot is 100%, and the free space ratio of (k−1)-th sub-blind spot is less than or equal to the (k−1)-th threshold value is referred to as a third case, the alarm device informs the driver that an object is closer to the vehicle in the second case and the third case as compared to the vehicle in the first case.

4. The method of claim 2, wherein, on condition that the free space ratio of the k-th sub-blind spot exceeds the k-th threshold value and is less than or equal to a k'-th threshold value which is set to be a value greater than the k-th threshold value, if the free space ratio of a (k+1)-th sub-blind spot is less than or equal to a (k+1)-th threshold value, the alarm device warns the driver differently according to the distance between the vehicle and the k-th sub-blind spot.

5. The method of claim 2, wherein the alarm device obtains movement information of the object within the first sub-blind spot to the n-th sub-blind spot by referring to each rate of change in the free space ratio of each of the first sub-blind spot to the n-th sub-blind spot, and
wherein the alarm device warns the driver according to a distance between the k-th sub-blind spot and the vehicle by referring to the obtained movement information of the object.

6. The method of claim 5, wherein, if the free space ratio in the (k+1)-th sub-blind spot increases from a state in which the free space ratio is less than or equal to a (k+1)-th threshold value and if the free space ratio in the k-th sub-blind spot decreases, the alarm device determines that the object is moving from the (k+1)-th sub-blind spot to the k-th sub-blind spot,
wherein, if the free space ratio in the (k−1)-th sub-blind spot increases from a state in which the free space ratio is less than or equal to a (k−1)-th threshold value and if the free space ratio in the k-th sub-blind spot decreases, the alarm device determines that the object is moving from the (k−1)-th sub-blind spot to the k-th sub-blind spot, and
wherein the alarm device warns the driver according to the distance between the k-th sub-blind spot and the vehicle by further referring to the movement direction of the object in the k-th sub-blind spot.

7. The method of claim 2, wherein the alarm device refers to a rate of change in the free space ratio in the k-th sub-blind spot to thereby check a velocity or an acceleration of the object, and refers to the velocity or the acceleration of the object to thereby warn the driver according to the distance between the k-th sub-blind spot and the vehicle.

8. The method of claim 7, wherein, on condition that it is determined that the object is approaching the vehicle as a result of checking the velocity or the acceleration of the object, if the free space ratio of the k-th sub-blind spot is less than or equal to a k''-th threshold value which is set to be a value greater than the k-th threshold value, the alarm device warns the driver according to the distance between the k-th sub-blind spot and the vehicle.

9. The method of claim 1, wherein, if the rear image represents a rear image obtained from a t-th frame, at the step of (c), the alarm device checks a relative movement direction of the object corresponding to a running direction of the vehicle by using (i) a t-th ratio which represents the free space ratio in the blind spot obtained from the rear image in the t-th frame and (ii) each of a (t−1)-th ratio to a (t−i)-th ratio which represents the free space ratio in the blind spot obtained from the rear image in a (t−1)-th frame to the rear image in a (t−i)-th frame, and warns the driver of the risk of the lane change by referring to the relative movement direction of the object.

10. The method of claim 9, wherein the alarm device analyzes an increase rate of from the (t−i)-th rate to the t-th rate, and, if the increase rate is a negative value, determines that the object has moved from an external side of the blind spot to an inner side of the blind spot, and, if the increase rate is a positive value, determines that the object has moved from the inner side of the blind spot to the external side of the blind spot, and wherein the alarm device warns the driver of the risk of the lane change by further referring to the determined movement direction of the object.

11. The method of claim 10, wherein the alarm device analyzes the segmentation image at a specific frame which is selected among the (t−i)-th frame to the t-th frame by referring to information on which of the (t−i)-th rate to the t-th rate changes from a rate of 100% to a rate of less than 100%, wherein the alarm device determines whether an area where the object is located in the blind spot is an area adjacent to the vehicle or an area away from the vehicle to thereby check a location of entrance of the object into the blind spot, then checks a movement direction of the object relative to that of the vehicle by referring to the location of the entrance of the object into the blind spot and the movement direction of the object, and wherein the alarm device warns the driver of the risk of the lane change by further referring to the movement direction of the object relative to that of the vehicle.

12. The method of claim 1, wherein, at the step of (a), the warning device applies at least one convolutional operation to the rear image to thereby generate at least one feature map as a downsampled feature map and then applies at least one deconvolutional operation to the downsampled feature map to thereby segment the road area and the object in the rear image.

13. An alarm device for warning a vehicle of a risk of lane change, comprising:
a communication part for acquiring at least one rear image captured by a running vehicle; and
a processor for performing processes of (I) segmenting the rear image by using a learned convolutional neural network (CNN) to thereby obtain a segmentation image corresponding to the rear image, (II) checking at least one free space ratio in at least one blind spot by referring to the segmentation image, wherein the free space ratio is determined as a ratio of a road area without an object in the blind spot to a whole area of the blind spot, and (III) if the free space ratio is less than or equal to at least one predetermined threshold value, warning a driver of the vehicle of the risk of lane change.

14. The alarm device of claim 13, wherein the blind spot includes a first sub-blind spot to an n-th sub-blind spot which are set by distances in a direction away from a rear of the vehicle,
wherein each of a first threshold value to an n-th threshold value, as each threshold value for the free space ratio, is set for each of the first sub-blind spot to the n-th sub-blind spot, and
wherein, at the process of (III), the processor warns the driver differently according to a distance between the vehicle and a k-th sub-blind spot having the free space ratio less than or equal to a k-th threshold value.

15. The alarm device of claim 14, wherein, on condition that (i) a case that the free space ratio of the k-th sub-blind spot is less than or equal to the k-th threshold value, and the free space ratio of (k−1)-th sub-blind spot is 100% is referred to as a first case, (ii) a case that the free space ratio of the k-th sub-blind spot is less than or equal to the k-th threshold value, and the free space ratio of (k−1)-th sub-blind spot is less than or equal to the (k−1)-th threshold value is referred to as a second case, and (iii) a case that the free space ratio of the k-th sub-blind spot is 100%, and the free space ratio of (k−1)-th sub-blind spot is less than or equal to the (k−1)-th threshold value is referred to as a third case, the processor informs the driver that an object is closer to the vehicle in the second case and the third case as compared to the vehicle in the first case.

16. The alarm device of claim 14, wherein, on condition that the free space ratio of the k-th sub-blind spot exceeds the k-th threshold value and is less than or equal to a k'-th threshold value which is set to be a value greater than the k-th threshold value, if the free space ratio of a (k+1)-th sub-blind spot is less than or equal to a (k+1)-th threshold value, the processor warns the driver differently according to the distance between the vehicle and the k-th sub-blind spot.

17. The alarm device of claim 14, wherein the processor obtains movement information of the object within the first sub-blind spot to the n-th sub-blind spot by referring to each rate of change in the free space ratio of each of the first sub-blind spot to the n-th sub-blind spot, and
wherein the processor warns the driver according to a distance between the k-th sub-blind spot and the vehicle by referring to the obtained movement information of the object.

18. The alarm device of claim 17, wherein, if the free space ratio in the (k+1)-th sub-blind spot increases from a state in which the free space ratio is less than or equal to a (k+1)-th threshold value and if the free space ratio in the k-th sub-blind spot decreases, the processor determines that the object is moving from the (k+1)-th sub-blind spot to the k-th sub-blind spot,
wherein, if the free space ratio in the (k−1)-th sub-blind spot increases from a state in which the free space ratio is less than or equal to a (k−1)-th threshold value and if the free space ratio in the k-th sub-blind spot decreases, the processor determines that the object is moving from the (k−1)-th sub-blind spot to the k-th sub-blind spot, and
wherein the processor warns the driver according to the distance between the k-th sub-blind spot and the vehicle by further referring to the movement direction of the object in the k-th sub-blind spot.

19. The alarm device of claim 14, wherein the processor refers to a rate of change in the free space ratio in the k-th sub-blind spot to thereby check a velocity or an acceleration of the object, and refers to the velocity or the acceleration of the object to thereby warn the driver according to the distance between the k-th sub-blind spot and the vehicle.

20. The alarm device of claim 19, wherein, on condition that it is determined that the object is approaching the vehicle as a result of checking the velocity or the acceleration of the object, if the free space ratio of the k-th sub-blind spot is less than or equal to a k"-th threshold value which is set to be a value greater than the k-th threshold value, the processor warns the driver according to the distance between the k-th sub-blind spot and the vehicle.

21. The alarm device of claim 13, wherein, if the rear image represents a rear image obtained from a t-th frame, at the process of (III), the processor checks a relative movement direction of the object corresponding to a running direction of the vehicle by using (i) a t-th ratio which represents the free space ratio in the blind spot obtained from the rear image in the t-th frame and (ii) each of a (t−1)-th ratio to a (t−i)-th ratio which represents the free space ratio in the blind spot obtained from the rear image in a (t−1)-th frame to the rear image in a (t−i)-th frame, and warns the driver of the risk of the lane change by referring to the relative movement direction of the object.

22. The alarm device of claim 21, wherein the processor analyzes an increase rate of from the (t−i)-th rate to the t-th rate, and, if the increase rate is a negative value, determines that the object has moved from an external side of the blind spot to an inner side of the blind spot, and, if the increase rate is a positive value, determines that the object has moved from the inner side of the blind spot to the external side of the blind spot, and wherein the processor warns the driver of the risk of the lane change by further referring to the determined movement direction of the object.

23. The alarm device of claim 22, wherein the processor analyzes the segmentation image at a specific frame which is selected among the (t−i)-th frame to the t-th frame by referring to information on which of the (t−i)-th rate to the t-th rate changes from a rate of 100% to a rate of less than 100%, wherein the processor determines whether an area where the object is located in the blind spot is an area adjacent to the vehicle or an area away from the vehicle to thereby check a location of entrance of the object into the blind spot, then checks a movement direction of the object relative to that of the vehicle by referring to the location of the entrance of the object into the blind spot and the movement direction of the object, and wherein the processor warns the driver of the risk of the lane change by further referring to the movement direction of the object relative to that of the vehicle.

24. The alarm device of claim 13, wherein, at the process of (I), the processor applies at least one convolutional operation to the rear image to thereby generate at least one feature map as a downsampled feature map and then applies at least one deconvolutional operation to the downsampled feature map to thereby segment the road area and the object in the rear image.

* * * * *